D. B. WILLIAMS.
NUT SHELLER AND SEPARATOR.
APPLICATION FILED APR. 9, 1915.
1,157,199.
Patented Oct. 19, 1915.
3 SHEETS—SHEET 1.
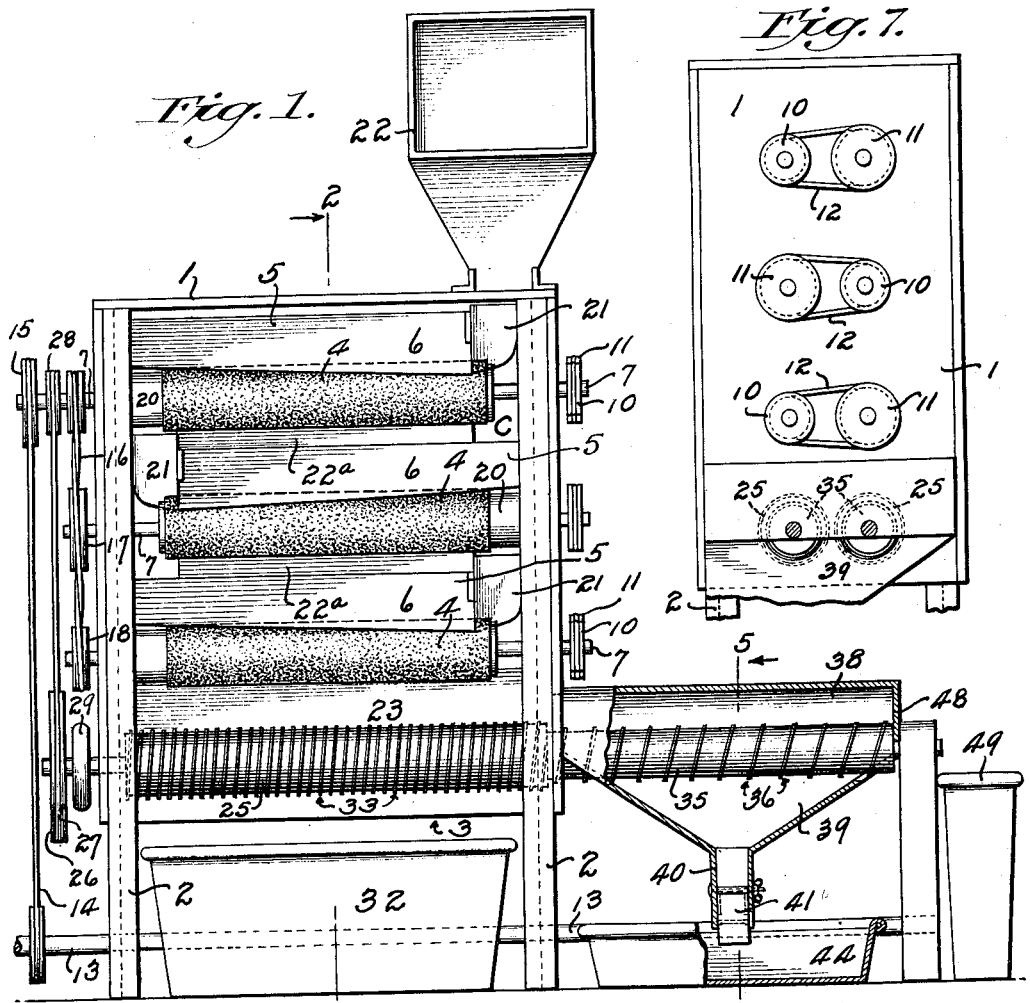

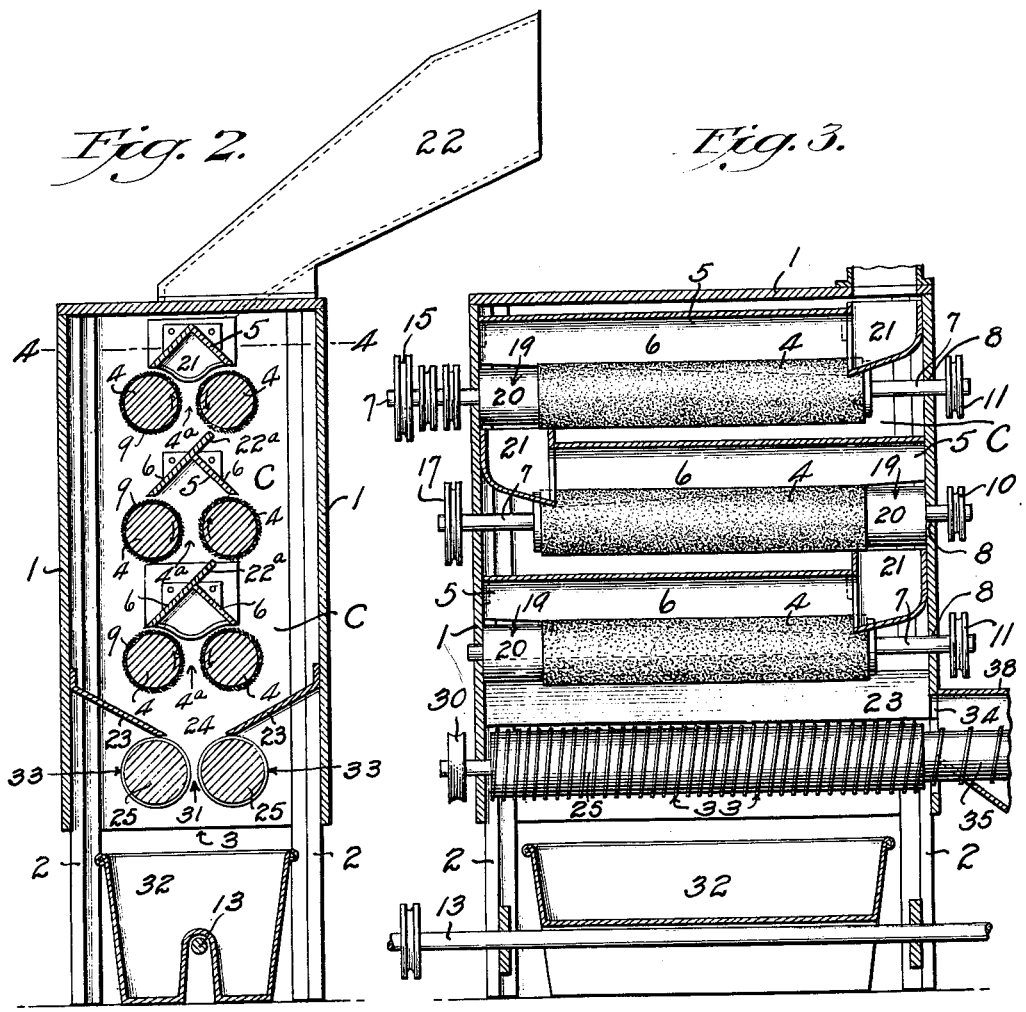
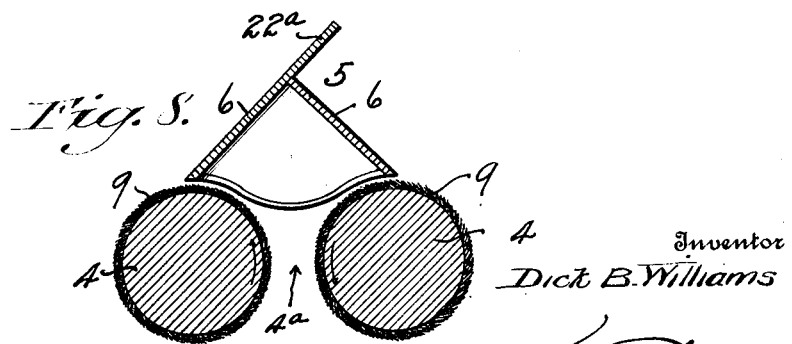

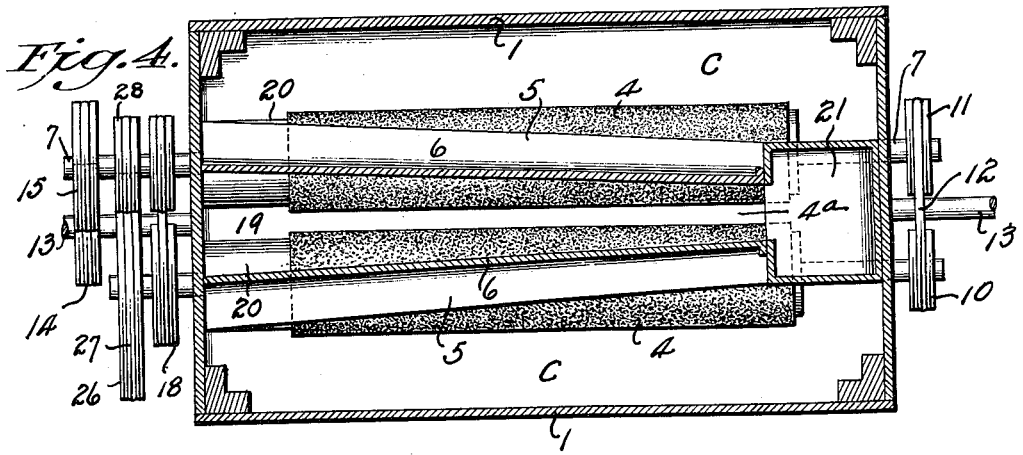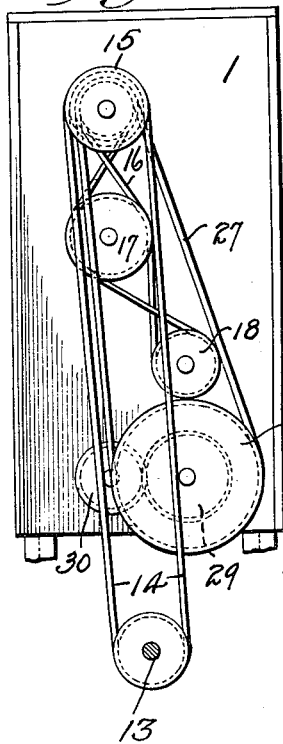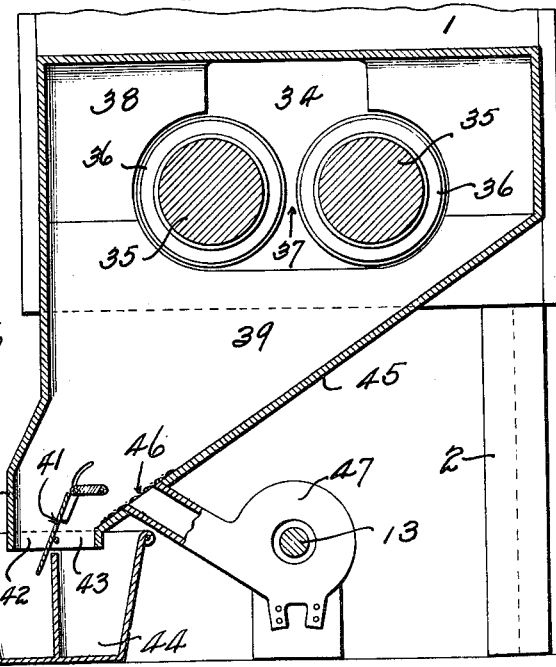

UNITED STATES PATENT OFFICE.

DICK B. WILLIAMS, OF NEW ORLEANS, LOUISIANA, ASSIGNOR TO LOUISIANA NUT & PRODUCE COMPANY, OF NEW ORLEANS, LOUISIANA, A CORPORATION OF LOUISIANA.

NUT SHELLER AND SEPARATOR.

1,157,199.   Specification of Letters Patent.   Patented Oct. 19, 1915.

Application filed April 9, 1915. Serial No. 20,257.

*To all whom it may concern:*

Be it known that I, DICK B. WILLIAMS, citizen of the United States, residing at New Orleans, in the parish of Orleans and State of Louisiana, have invented certain new and useful Improvements in Nut Shellers and Separators, of which the following is a specification.

This invention relates to shelling and separating mechanisms possessing special utility in use with cracked nuts though necessarily having general application to analogous uses.

The primary object of the invention is to provide a simple, practical, and efficient shelling and separating mechanism adapted specially for handling previously cracked nuts, such as pecans, and comprising means for loosening and picking the shell particles from the nut meat without injury to the latter, so that the nut meats can be delivered from the machine in the best marketable condition.

To this end, the invention has particularly in view a mechanism for handling cracked nuts in such a manner that with nuts of the pecan type, the shell particles will be removed and disposed of without breaking up the meats, and the latter will be recovered from the machine in substantially unbroken halves.

A further object of the invention is to provide for not only the loosening and picking of the shell particles from the meats, but also the effectual separation of the meats and the shell particles, and the separation from the latter of uncracked or imperfectly cracked nuts that have not been affected by the sheller mechanism.

With these and other objects in view which will be apparent to those familiar with this art, the invention consists in the novel construction, combination, and arrangement of parts hereinafter more fully described, illustrated, and claimed.

The essential features of the invention are necessarily susceptible of a wide range of structural modification, within the scope of the appended claims, without departing from the principle of the invention, but a preferred and practical embodiment thereof is shown in the accompanying drawings, in which—

Figure 1 is a side elevation of a nut sheller and separator constructed in accordance with the present invention showing one of the side casing plates removed to expose the arrangement of the superposed shelling units. Fig. 2 is a vertical transverse sectional view of the machine. Fig. 3 is a vertical longitudinal sectional view. Fig. 4 is an enlarged horizontal sectional view on the line 4—4 of Fig. 2, showing the flaring form of the baffle-hood of each of the shelling units. Fig. 5 is an enlarged detail sectional view on the line 5—5 of Fig. 1 through the delivery extensions of the discharging separator-rolls of the mechanism. Fig. 6 is an end view of the machine illustrating the gearing for one end of the rolls. Fig. 7 is a similar view showing the gearing for the other ends of the rolls. Fig. 8 is an enlarged detail view of one of the shelling units of the machine. Fig. 9 is a detail plan view of the discharging separator-rolls below the lowermost shelling unit.

Similar reference characters designate corresponding parts throughout the several figures of the drawings.

The distinctive feature of the present invention resides in the employment of a plurality of shelling units of novel construction and arrangement, in combination with a discharging unit constituting the bottom delivery of the separating chamber within which the shelling units are located. The separating chamber is inclosed within an upright machine casing 1 which may be of any suitable dimensions according to the number of shelling units contained therein. The said casing is usually carried by a frame or stand 2, and is open at the bottom as at 3 to provide a main bottom discharge for all of the material which passes to the said discharging unit.

The separating chamber is designated generally by the reference letter C, and the shelling units therein are arranged one above the other and intercommunicate to provide a continuous shelling operation from the top to the bottom of the separating chamber. The several shelling units are of duplicate construction, and each of the same essentially comprises a pair of combined picker and buffeting rolls 4—4, and a feeding baffle-hood 5 overlying the pair of rolls and forming a top cover therefor, the said hood extending entirely over the clearance space or interval $4^a$ provided between the rolls.

The rolls 4 of each shelling unit are of duplicate construction. They have a similar relation to one another with respect to their surface coverings, but a differential relation as to speed in order to function both as picking elements for pulling or picking the loose shell pieces from the nut meats, and as buffeting elements to actively agitate the cracked nut and rather sharply buffet the same back and forth between the roll surfaces and the rebound impact walls 6 of the baffle-hood 5.

In explanation of the special relation between the rolls 4—4 of each shelling unit, it will first be noted that the said rolls are mounted in a horizontal position, having their spindle extremities 7 journaled in suitable bearings 8 provided at opposite ends of the machine casing 1. These rolls are spaced a suitable distance apart to provide the clearance space or interval $4^a$ which will permit pieces of shell, small broken pieces of nut meat, and other debris to readily pass therethrough, while at the same time the rolls are sufficiently close together to support on the upper moving surfaces thereof the unshelled nuts and the larger pieces of nut meat which are handled by the bottom discharging unit and delivered into suitable receptacles or receivers therefor. The surface coverings of the rolls may be satisfactorily formed of cloth of the character of plush or velvet whose pile or nap lies smoothly in one direction, thus providing for the purposes of the present invention what may be termed a spined surface covering 9 for each of the rolls 4, which surface covering presents picking-spines disposed substantially tangential to the roll peripheries. The opposing relation to one another of the surface coverings of the separate rolls of each unit plainly appears in Figs. 2 and 8 of the drawings, and consists in having the tangential picking spines on the adjacent sides of the respective rolls disposed in opposite directions.

In addition to the features referred to, the rolls 4—4 of each shelling unit are geared to rotate in the same direction so that the adjacent portions of the peripheries of the said rolls move in opposite directions as indicated by the arrows in Figs. 2 and 8 of the drawings. Furthermore one of the rolls of each pair or unit is rotated at a considerably higher rate of speed than the other. Provision is made for maintaining a uniform action and movement of the rolls 4—4, while at the same time preserving this differential speed relation thereof. That may be accomplished by any of the conventional forms of gearing, but for illustrative purposes the spindle extremities 7 of each pair of rolls 4—4 are shown fitted at one end with the belt pulleys 10 and 11 which are respectively of different sizes and are directly geared together by a motion transmitting belt 12. By reason of the difference in size of the pulleys 10 and 11, a higher rate of speed is imparted to one of the rolls than to the other.

In Fig. 7 of the drawings is shown the differential gearing for all of the picker and buffeting rolls, and in connection therewith it is to be further observed that the high speed rolls in the several shelling units are alternated. That is to say the differential relation between the two rolls in one shelling unit is reversed with respect to the rolls of the unit preceding the same, so that the cracked nuts as they course through the machine are subjected to reversed buffeting actions which materially assist in loosening the shell particles from the nut meats, thus facilitating the separation thereof through the action of the picking spines on the roll surfaces.

The drive gearing for the various rolls of the machine may be conveniently arranged at the end of the casing opposite the differential gearing 10, 11 and 12, and said drive gearing is shown in Fig. 6 of the drawings. This gearing includes a drive shaft 13 driven from an electric motor or other source of power and having a belt connection 14 with a pulley 15 on one spindle extremity of one of the uppermost rolls 4. The said spindle extremity, in turn, has a belted connection 16 with a pulley 17 on a spindle extremity of a roll 4 of the next lower unit, and said belted connection is also continued into engagement with a pulley 18 on a spindle extremity of one of the lowermost rolls 4. This completes the shown form of drive gearing for imparting the necessary motion to all of the rolls 4 of all the shelling units, while at the same time giving a faster rotation to one of the rolls of each unit than to the other.

The various shelling units intercommunicate through the medium of the feeding baffle-hoods 5. Each of these hoods 5 is of a substantially inverted V-shape in cross section, thus forming the oppositely inclined impact walls 6 disposed over the respective rolls 4 of the unit with which the hood is associated.

A further feature of practical importance in connection with the rebound baffle-hoods 5 is that of having the inclined walls 6 diverging from one another toward the discharging end of the unit, thereby providing a hood-construction which flares in the direction of its discharge, as may be best seen from the horizontal view of Fig. 4 of the drawings. At its wider discharging end, each baffle-hood 5 is entirely open at the bottom in order to permit the unshelled nuts and the shelled meats to pass through the end discharge opening 19 for the unit, which discharge opening is formed between the uncovered roll extremities 20, as may be also plainly seen from Fig. 4 of the drawings. The opposite end of each baffle-hood has suitably fitted thereto an inclosed feeding spout 21 which is in open communication with the interior of the hood at one end, and is also open at the top to receive its supply of unshelled nuts and nut meats. The feeding spout 21 for the uppermost shelling unit receives the supply of cracked nuts from a suitable feed hopper 22 arranged at the top of the machine, and usually and preferably associated with the nut cracking machine so as to receive the supply of material directly from the latter. The feeding spout 21 for each succeeding shelling unit is arranged directly below and in communication with the end discharge opening 19 for the shelling unit immediately thereabove, thus providing a continuous line of communication between the several baffle-hoods and the bottom part of the separating chamber C, as clearly illustrated in Fig. 3 of the drawings.

Below each preceding shelling unit, each feeding baffle-hood 5 is provided at its crown with an upwardly inclined deflecting apron extension 22ª which may conveniently form a continuation of one of the impact walls 6, so that the latter and the said apron extension constitute an inclined throw-off deflector on the outside of the head which is disposed below, and in the vertical plane of, the clearance space 4ª between the rolls 4—4 of the unit immediately thereabove. Means are thus provided for deflecting shell particles and other debris laterally to one side of the series of shelling units and into the side portions of the separating chamber C, so that the same falls into the bottom part of the chamber having therein the oppositely inclined bottom walls 23 converging to a central bottom discharge opening 24. Immediately below the discharge opening 24, and obstructing the same, is the discharging unit which constitutes the bottom delivery of the separating chamber.

The bottom discharging unit consists of a pair of separator rolls 25 which are mounted in a horizontal position with their spindle extremities journaled in suitable bearings provided therefor, and these rolls may be conveniently driven from the drive gearing for the rolls of the shelling units, as illustrated in Fig. 6 of the drawings. As shown therein, a spindle extremity of one of the rolls 25 may be provided with a pulley 26 having a belted connection 27 with a pulley 28 on a spindle extremity of one of the uppermost rolls 4, and friction or equivalent gears 29 and 30 may be utilized to directly gear together the two separator rolls.

The rolls 25 are spaced sufficiently close together to retain on and between the upper moving surfaces thereof the shelled nut meats, as well as any uncracked or imperfectly cracked nuts that may have entered and passed through the machine. At the same time, the clearance space or interval 31 between the rolls 25 permits most of the shell particles and debris to drop into a debris-receptacle 32 which may be conveniently placed within the bottom part of the machine stand below the open bottom 3 of the casing. To provide for moving outward the material arrested and caught thereby, the separator rolls 25 are provided thereon with a light spiral conveyer flight 33 which steadily but gently moves the nut meats and uncracked nuts outward through an end discharge opening 34 provided in one end of the machine casing at the bottom thereof. The material which passes through the said end discharge opening 34 passes onto the exterior reduced roll extension 35 having spiral flights 36 thereon of coarser pitch than the flights 33 of the main roll portions 25. Also the reduced roll extensions provide therebetween a wider clearance space or interval 37 than the clearance space or interval 31, as will clearly appear from Fig. 9 of the drawings.

The external reduced roll extensions 35 are preferably arranged to operate within a delivery chamber 38 having a hopper bottom 39 provided with a discharge spout 40 within the mouth of which spout is adjustably mounted a deflector gate 41. The purpose of this deflector gate is to divide the outlet of the spout 40 into the separate passages 42 and 43, which respectively discharge light shell particles and debris and shelled meats. A double compartment receptacle 44, or an equivalent receiver, is arranged below the spout 40 to separately receive the material passing through the passages 42 and 43 thereof.

The hopper bottom 39 of the delivery chamber 38 is preferably formed with a main inclined deflecting wall 45 which leads directly into the nut-meat discharge 43 and which, at a suitable point, is pierced by a screened blast opening 46 through which a blast of air is discharged from a cleaning fan 47. The effect of the blast of air through the opening 46 is to separate light shell particles and debris from the nut meats and blow the same into the line of discharge through the outlet passage 42, while the heavier and larger nut meats are permitted to gravitate to their point of discharge through the outlet passage 43.

As already indicated, one of the distinctive and important features of the present invention resides in the construction and action of the individual shelling units. Referring more particularly thereto, it should be noted that by reason of the differential speed of the rolls of each unit, the rotation thereof in the same direction, and the tangential disposition of the spined surfaces 9 thereof, these rolls subject the cracked nuts to a rapid and sharp agitation which causes the nut to be buffeted back and forth between the roll surfaces and the inclined rebound impact walls 6, with the result of continually jarring and loosening the shell particles so that the picking spines, formed by the surfaces 9 will gradually pick and work said particles off of the nut meats without injury to the latter. While this operation is taking place, the inclined walls 6 of the hoods 5 not only operate as baffles against which the cracked nuts bound and rebound, but also function as a feeding means for deflecting the material always in a direction toward the wider end of the hoods, or in other words in the direction of the end discharge openings 19 of the individual shelling units. The action described, though sufficiently violent to loosen the shell particles from the nut meats, is not injurious to the latter because of the character of the surface coverings of the rolls, which coverings act as cushions for the nut meats, while also positively and effectually performing the function of picking and buffeting means for the nuts. Various forms of surface coverings can be utilized for this purpose, such for instance as a cloth covering of the character referred to, but it will of course be understood that properly positioned brush bristles or equivalent elements could be made to subserve the same function. Also with respect to other parts of the machine, it is to be understood that various changes in the form, proportion, and minor details of the construction may be resorted to without departing from the spirit of the invention or scope of the appended claims. It will have been noted that uncracked or imperfectly cracked nuts which pass through the machine unaffected are discharged by the delivery extensions 35 of the separator rolls through a cast-out opening 48 in one end of the delivery chamber 38, and adjacent to this point of discharge a nut receiving receptacle 49 may be conveniently arranged.

I claim:

1. A nut sheller and separator, including a shelling unit consisting of a pair of spaced rolls carrying shell picking means, and a fixed rebound impact-surface overlying the rolls.

2. A nut sheller and separator, including a shelling unit consisting of a pair of horizontal spaced rolls carrying shell picking means, and a fixed rebound impact-surface overlying the rolls.

3. A nut sheller and separator, including a shelling unit consisting of a pair of horizontal spaced rolls carrying shell picking means, and a longitudinally flaring fixed rebound member overlying the rolls.

4. A nut sheller and separator, including a shelling unit consisting of a pair of spaced rolls rotating in the same direction but at different speeds and carrying shell picking means.

5. A nut sheller and separator, including a shelling unit consisting of a pair of horizontal spaced rolls rotating in the same direction but at different speeds and carrying shell picking means, and a longitudinally flared rebound impact member overlying the rolls.

6. A nut sheller and separator, including a shelling unit consisting of a pair of horizontal spaced rolls rotating at different speeds and having tangentially disposed shell picking elements thereon, and a nut-guiding hood overlying the rolls and presenting walls from which the cracked nuts rebound.

7. A nut sheller and separator, including a shelling unit comprising a pair of horizontal rolls carrying shell picking means rotating at different speeds, and a hood of arched form overlying said rolls.

8. A nut sheller and separator, including a shelling unit comprising a pair of horizontal rolls carrying shell picking means rotating at different speeds, and a hood of transversely arched form overlying said rolls and flaring in width longitudinally.

9. A nut sheller and separator including a shelling unit, comprising a pair of horizontal rotating rolls, spaced at one end to form an end discharge opening, and a baffle-hood of arched form overlying said rolls and flared in width toward said discharge opening.

10. A nut sheller and separator including a shelling unit, comprising a pair of spaced horizontal rotating rolls having a spacing at one end that forms an end discharge opening, and a baffle-hood overlying the rolls, said baffle-hood having inclined impact walls which diverge in the direction of said end discharge opening.

11. A nut sheller and separator including a separating chamber having a bottom discharge opening, a plurality of intercommunicating shelling units arranged in said chamber and each comprising a pair of picker and buffeting rolls, and a feeding baffle-hood thereover, the hood of each succeeding unit being provided with an external inclined throw-off deflector below the clearance space of the rolls of the preceding unit.

12. A nut sheller and separator including a separating chamber having a bottom discharge opening, a plurality of intercommunicating shelling units arranged in said chamber and each comprising a pair of horizontal rotating rolls, and a baffle-hood overlying said rolls, the hood of each succeeding unit being provided with an external throw-off deflector below the clearance space of the rolls of the preceding unit.

13. A nut sheller and separator including a separating chamber having a bottom discharge opening, shelling devices arranged within the chamber above said opening, and a separating discharging unit arranged beneath the opening and consisting of a pair of rolls having separate portions provided respectively with conveyer flights of relatively closed and open formation.

14. A nut sheller and separator including a separating chamber having a bottom discharge opening, shelling devices within said chamber above said opening, and a discharging unit arranged beneath the opening consisting of a pair of flighted conveyer rolls having external delivery extensions, the delivery extensions of the rolls having a wider discharging space therebetween than the interior portions of the rolls, and also having a wider spacing of the conveyer flights thereon.

15. A nut sheller and separator including a separating chamber having a bottom discharge opening, a delivery chamber having a plurality of outlets, shelling devices within the separating chamber, and a separating discharge unit arranged beneath said discharge opening of the separating chamber and having delivery extensions operating within the delivery chamber.

16. A nut sheller and separator including a separating chamber having a bottom discharge opening, a delivery chamber having a plurality of outlets, shelling devices within the separating chamber, a separating discharge unit arranged beneath said discharge opening of the separating chamber and having delivery extensions operating within the delivery chamber, and an air blast connection above the said outlet passages of the delivery chamber.

In testimony whereof I hereunto affix my signature in the presence of two witnesses.

DICK B. WILLIAMS.

Witnesses:
  L. P. O'Dowd,
  A. C. Lecourt.